Nov. 5, 1940.  H. BERG  2,220,389
COLLIMATOR
Filed July 7, 1937
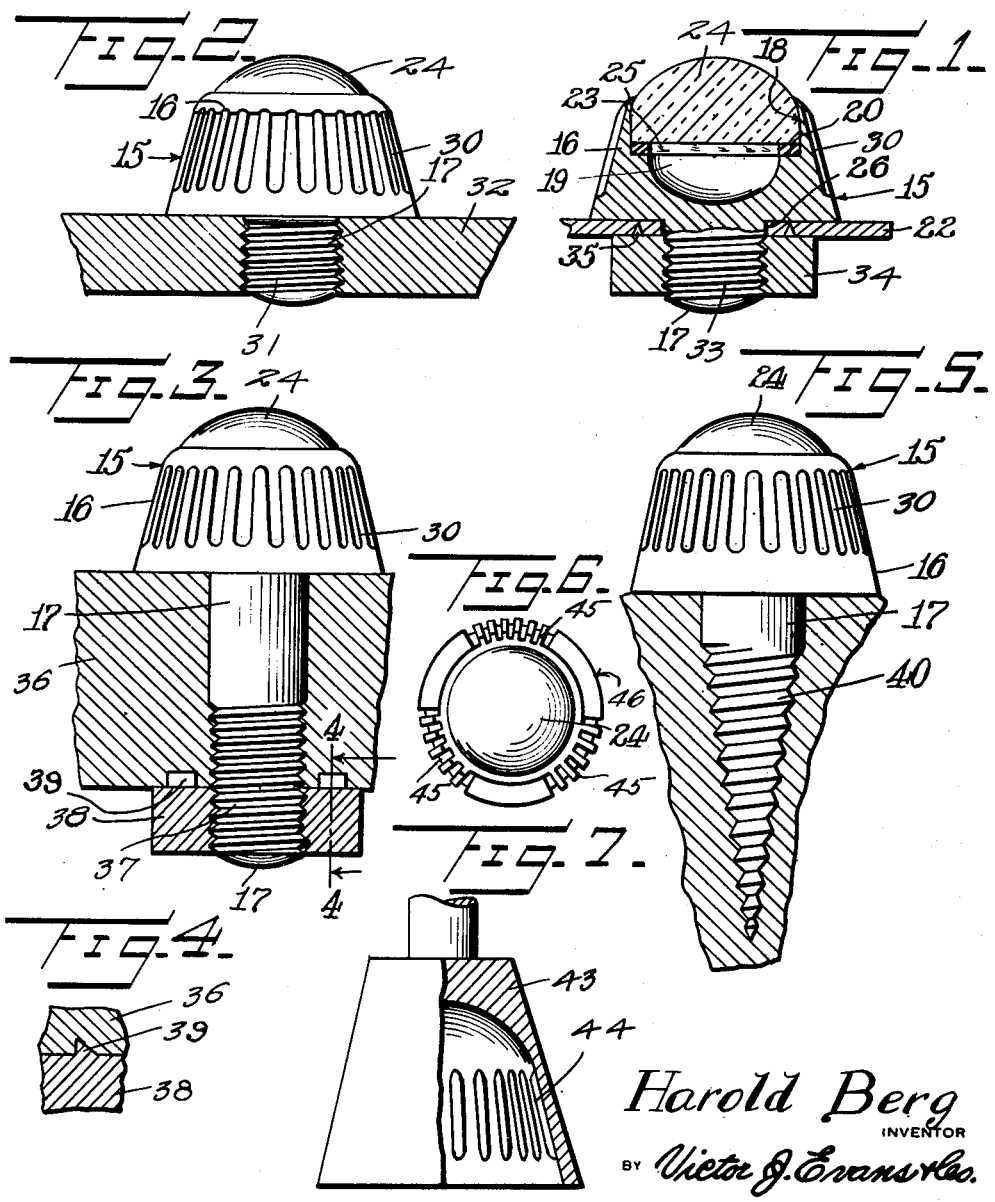
Harold Berg
INVENTOR
BY Victor J. Evans & Co.
ATTORNEYS Patented Nov. 5, 1940

2,220,389

UNITED STATES PATENT OFFICE 2,220,389

COLLIMATOR

Harold Berg, Pierre, S. Dak.

Application July 7, 1937, Serial No. 152,425

2 Claims. (Cl. 88—82)

My invention relates to collimators and more particularly to collimators adaptable for attachment to various objects, such as guard rails, buildings and the like.

One of the principal objects of my invention is to provide a collimator equipped with means for reliably securing it to various objects such as guard rails, road signs and the like and which will reflect the rays of light directed thereon.

Another object of my invention is to provide a readily attachable collimator which is simple in construction, durable in use and economical in manufacture.

Other objects and advantages will be apparent from the following description, appended claims and annexed drawing.

Referring to the drawing wherein like reference characters designate like parts throughout the several views:

Figure 1 is a vertical sectional view of my invention attached to a supporting object.

Figure 2 is a side elevation of a modified form of my invention.

Figure 3 is a side elevation, partly in section, of another modified form.

Figure 4 is a detail sectional view taken on the line 4—4 of Figure 3.

Figure 5 is a side elevation of a further modification.

Figure 6 is a plan view of a modified form of head section.

Figure 7 is a side elevation, partly in section, of a tool for attaching and detaching my invention to and from a supporting object.

In practicing my invention, as illustrated in Figure 1 of the drawing, I provide a body 15 having head and shank sections 16 and 17 respectively. The upper face of the head section is formed with a centrally disposed bore 18 terminating at its lower end in a reduced concave recess 19 and defining a circumferential shoulder 20 at the jointure of the bore and recess. The head section is provided with a lower face overlying the outer face of a supporting object 22 and with an upper edge portion disposed inwardly of the bore for forming a flange 23 for securing within the bore a lens 24, the latter having an outwardly projecting dome-shaped section and constructed of colored glass or the like. Interposed between the lens and the shoulder 20 is a gasket 25 constructed of any suitable material, for instance rubber or cork, which normally tends to seat the lens in said bore in a fixed and tensioned condition against the flange 23. The shank section 17 is disposed through an opening 26 formed in the object 22 and is provided with threads 33 on which is threaded a nut 34 coacting with the base of the head to secure the device fixed to the object 22. The nut 34 is provided on its inner face with a plurality of cone-shaped members 35 for engagement with the rear face of the supporting object to preclude accidental displacement of the nut.

In the modified form illustrated in Figure 2 of the drawing the shank section is provided with threads 31 threaded into a metal supporting object 32.

In the modified form illustrated in Figure 3 of the drawing the shank section 17 is particularly adapted for use in connection with a relatively thick supporting object 36 and is provided with threads 37 on its lower end on which is threaded a nut 38 for securing the device to the object 36. The nut 38 is provided on its inner face with a plurality of teeth 39 for engagement with the supporting object to prevent displacement of the nut, as illustrated in Figure 4 of the drawing.

In the modified form illustrated in Figure 5 of the drawing the head section is connected to a shank section fashioned in the form of a lag screw 40 for retaining the body in relatively thick supporting objects constructed of wood, for instance logs or the like.

The head sections of the foregoing described forms are of a frustum-shaped configuration having their peripheral faces formed with circumferentially disposed and lengthwise extending corrugations 30 for a purpose hereinafter set forth.

As illustrated in Figure 7 of the drawing, I provide a tool 43 having a tapered or frustum-shaped bore adapted to receive the head section of one of the devices. The wall defining the bore is corrugated or provided with radially extending flanges or keys 44 adapted to interfit within the corrugations 30 and thus, upon rotation of the tool, serve to attach or detach the device from the supporting object.

The surfaces of the concave recesses in each of the head sections are highly polished or may be provided with suitable material for reflecting light rays directed thereon through said lens.

It will be apparent, from the foregoing, that my device is readily adaptable for attachment to various objects, such as signs, buildings, guard rails, fence posts and the like and that rays of light directed thereon will be reflected and serve to acquaint motorists and others of the presence of such objects.

It is to be distinctly understood that the term collimator, as used herein, is to be interpreted in the broadest sense and embraces various reflecting devices for reflecting rays of light.

In the form illustrated in Fig. 6, the corrugations 45 are formed in groups about the outer periphery of the body 46 to prevent the ready removal of the collimator by persons not possessed of a tool having similarly grouped corrugations.

It is to be further understood that various changes and modifications in construction and arrangement of the parts may be resorted to without departing from the spirit of the invention as defined by the appended claims.

Having described my invention, what I claim is:

1. A device of the character described, comprising, a body formed with head and shank sections, said head section adapted to overlie the outer face of a supporting object and provided with a centrally disposed lens protruding axially therefrom, said head section formed with a centrally disposed concaved recess postjacent said lens and with the wall defining said recess having a polished surface for reflecting light rays outwardly through said lens, said shank section adapted to extend through said object and provided with threaded means coacting with the said head section for maintaining said head section fixed to said object, said head section having a peripheral face formed with circumferentially disposed and lengthwise extending corrugations adapted for interfitting engagement with similar corrugations arranged within the socket of a tool when said head section is disposed within said socket whereby to effect rotation of said body with respect to said object by said tool.

2. A device of the character described, comprising, a body formed with head and shank sections, said head section adapted to overlie the outer face of a supporting object and provided with a centrally disposed lens protruding axially therefrom, said head section formed with a centrally disposed concaved recess postjacent said lens and with the wall defining said recess having a polished surface for reflecting light rays outwardly through said lens, said shank section adapted to extend through said object and provided with threaded means coacting with said head section for maintaining said head section fixed to said object, said head section having a peripheral face formed with circumferentially disposed and lengthwise extending spaced groups of corrugations adapted for interfitting engagement with similar groups of corrugations arranged within the socket of a tool when said head section is disposed within said socket whereby to effect rotation of said body with respect to said object by said tool.

HAROLD BERG.